3,014,938
PREPARATION OF 16,21-DIACETATE DERIVATIVE OF CYCLOPENTANOPHENANTHRENE COMPOUNDS

John S. Mills and Albert Bowers, Mexico City, Mexico, assignors to Syntex S.A., Mexico City, Mexico, a corporation of Mexico
No Drawing. Filed Aug. 23, 1960, Ser. No. 51,261
Claims priority, application Mexico Sept. 7, 1959
6 Claims. (Cl. 260—397.47)

The present invention relates to a novel method for the preparation of cyclopentanophenanthrene derivatives.

More particularly the present invention relates to a novel process for preparing 6α-fluoro-16α-hydroxy "S" 16,21-diacetate (6α-fluoro-$\Delta^4$-pregnen-16α,17α,21-triol-3,20-dione 16,21-diacetate) from the readily available 21-acetate of 16α,17α-oxido-$\Delta^5$-pregnen-3β,21-diol-20-one.

The starting material for the present process has been described by Julian et al., J.A.C.S., 72, 5145, 1950, and is readily produced in quantity from sapogenin starting materials. The end product of the present novel process namely 6α-fluoro-$\Delta^4$-pregnen-16α,17α,21-triol-3,20-dione 16,21-diacetate is a progestational hormone and further is an important intermediate for the production of potent cortical hormones having anti-inflammatory properties such as 6α-fluoro-16α-hydroxy derivatives of cortisone, hydrocortisone, prednisone and prednisolone and the same compounds and potent anti-inflammatory agents having 9α-halo substituents as will be hereinafter described in detail.

The actual starting material for the present process is the 21-acetate of 6β-fluoro-5α-bromo-16α,17α-oxido-pregnan-21-ol-3,20-dione which is prepared from 16α,17α-oxido-$\Delta^5$-pregnen-3β,21-diol-20-one by reaction with hydrogen fluoride and N-bromoacetamide in the presence of tetrahydrofurane and methylene chloride at low temperatures. This particular step and process for 6-fluorination is more particularly set forth and claimed in U.S. application Serial No. 818,505, filed June 8, 1959. The 6β-fluoro-5α-bromo-16α,17α-oxido-pregnan-3,21-diol-20-one 21-acetate prepared by this step is then conventionally oxidized to the 3-keto compound with chromic acid.

In accordance with the present invention the surprising discovery has been made that upon the reaction of the 21-acetate of 6β-fluoro-5α-bromo-16α,17α-oxido-pregnan-21-ol-3,20-dione with a hydrogen halide selected from the group consisting of hydrogen bromide and hydrogen chloride in the presence of acetic acid the 16α,17α-epoxide ring may be opened to form the corresponding 17α-hydroxy, 16-halo compound and the 5α-bromo group may be removed without at the same time removing the 6-fluoro group. It has further been discovered that the halohydrin thus formed upon acetylation at C–17 followed by reaction with either potassium acetate in acetic acid or dimethylformamide and a minor amount of water or dimethylacetamide and a minor amount of water gave the corresponding 16,21-diacetate without removing the 6-fluoro group. In one modification of the process of the present invention the 5α-bromo group was initially removed and the $\Delta^4$-double bond produced by reaction with sodium acetate in acetone prior to reaction with the hydrogen halide. The novel process of the present invention is illustrated by the following equation:

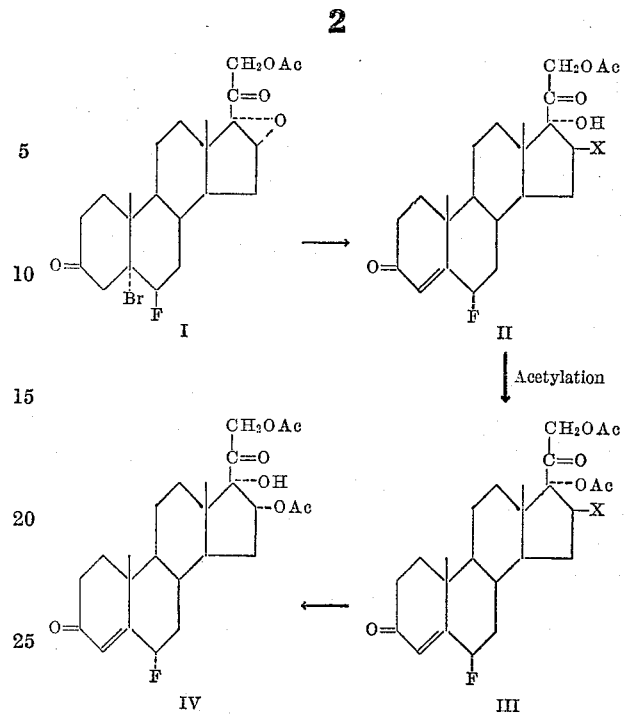

In the above equation Ac represents acetate and X is selected from the group consisting of chlorine and bromine.

The first step outlined above may within the broad scope of the present invention be specifically modified and as indicated below gives rise to the three types of intermediates IIa, IIb, and IIc.

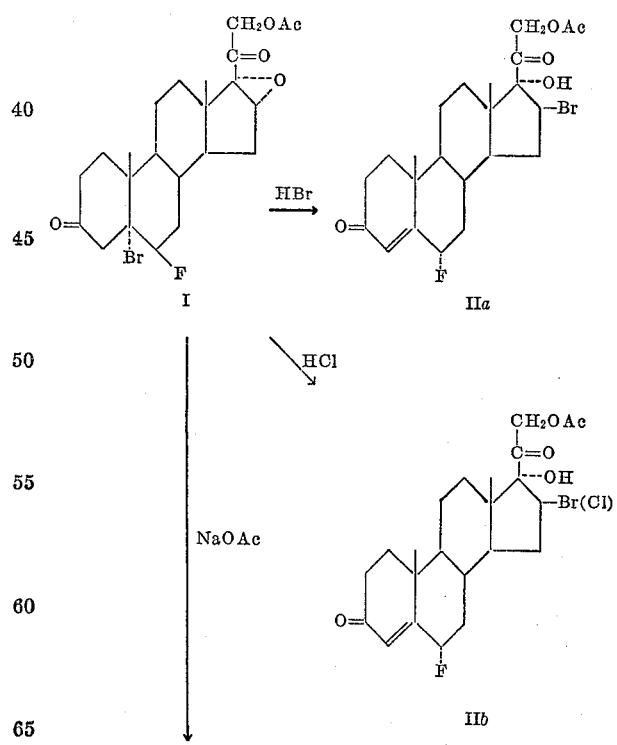

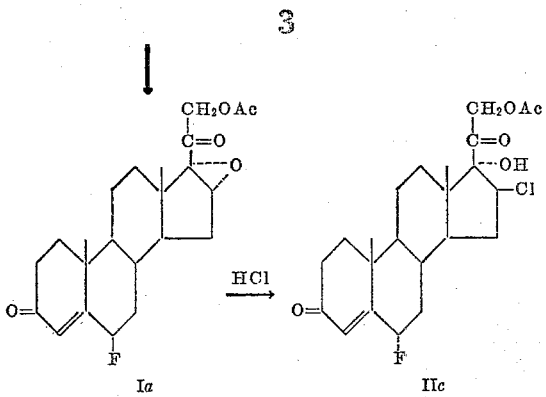

In the above formulas Ac represents acetate as heretofore set forth.

As indicated above treatment of the starting compound I with hydrogen bromide in acetic acid at temperatures below room temperature i.e. —5° C. to 15° C. for several hours gave the 16-bromo compound IIa. A similar treatment with hydrogen chloride gave a mixture of 16-bromo and 16-chloro derivatives with the bromo derivative predominating. Further, if the 5α-bromo group is removed as by heating with potassium acetate in acetone to give the intermediate i.e. the 21-acetate of 6β-fluoro-16α,17α-oxido-Δ⁴-pregnen-21-ol-3,20-dione Ia, and this compound is reacted with hydrogen chloride in acetic acid at temperatures below room temperature, there is produced the 16-chloro compound IIc.

For the next step of the reaction compound II (a, b, or c) is preferably reacted with acetic anhydride in the presence of glacial acetic acid and perchloric acid at room temperature. The resulting compound is the 17,21-diacetate of 6α-fluoro-16β-bromo and/or chloro-Δ⁴-pregnen-17α,21-diol-3,20-dione (III).

The diacetate (III) is then treated by refluxing with potassium acetate in acetic acid or with dimethylformamide or dimethyl acetamide in the presence of water with or without pyridine to produce the 16,21-diacetate of 6α-fluoro-Δ⁴-pregnen-16α,17α,21-triol-3,20-dione (IV). This compound was preferably saponified to the free triol for oxygenation use by conventional treatment with sodium carbonate in methanol.

The use of 6α-fluoro-Δ⁴-pregnen-16α,17α,21-triol-3,20-dione for the production of corticoids is outlined in the following equation:

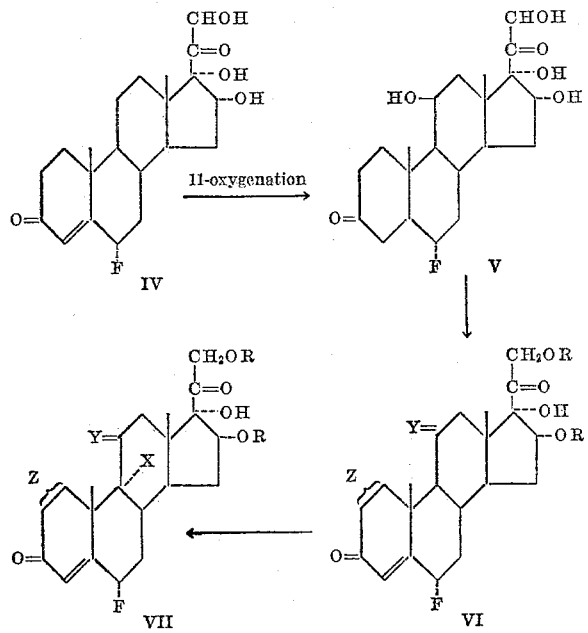

In the above equation R represents hydrogen or a hydrocarbon carboxylic acyl group of up to 12 carbon atoms such as acetate, propionate, cyclopentylpropionate or benzoate, Y represents =O or

Z represents a single bond between C-1 and C-2 or a double bond, and X represents chlorine or fluorine.

As outlined above IV is conventionally subjected to adrenal incubation or incubation with Cunninghamella Blakesleana ATCC 8688a or ATCC 8688b to introduce the 11β-hydroxy group and give 6α-fluoro-16α-hydroxy-hydrocortisone (V). As indicated in the step V to VI the hydrocortisone derivative upon conventional oxidation preferably in the form of its 16,21-diacetate was oxidized conventionally with chromic acid to the 16,21-diacetate of 6α-fluoro-16α-hydroxy-cortisone. This diacetate was then saponified conventionally to the free cortisone compound and by conventional esterification other esters were prepared. To prepare the prednisone and prednisolone derivatives the Δ⁴-compounds were dehydrogenated by refluxing with selenium dioxide in t-butanol and in the presence of pyridine. Finally as indicated in the step VI to VII, a 9α-halo group was introduced by the method of Fried et al., J.A.C.S., 79, 1130 (1957).

The following specific examples serve to illustrate but are not intended to limit the present invention.

*Example I*

A mixture of 53.5 g. of anhydrous hydrogen fluoride, 49 g. of tetrahydrofurane, 10.7 g. of N-bromoacetamide and 500 cc. of methylene chloride was cooled to —80° C.; a solution of 24.5 g. of the 21-acetate of 16α,17α-oxido-Δ⁵-pregnene-3β,21-diol-20-one in 100 cc. of methylene chloride was added and the mixture was stirred at —80° C. for 1 hour. It was then kept for one and a half hours at room temperature, poured into saturated aqueous sodium bicarbonate solution and extracted with ethyl acetate; the extract was washed with water to neutral, dried over anhydrous sodium sulfate and the solvent was evaporated. The oily residue was triturated with hot methanol, cooled and the crystalline solids was collected by filtration, thus yielding 14 g. of the 21-acetate of 5α-bromo-6β-fluoro-16α,17α-oxido - pregnane - 3β,21-diol-20-one having M.P. 165–170° C. Recrystallization of a small amount from acetone-hexane afforded the analytical sample M.P. 173–174° C., [α]_D+23.5° (chloroform). The crude product was used for the next step without further purification.

10 g. of the crude 21-acetate of 5α-bromo-6β-fluoro-16α,17α-oxido-pregnane-3β,21-diol-20-one was dissolved in 100 cc. of acetone, cooled to 0° C., flushed with nitrogen and treated with a solution of 8 N chromic acid, in a thin stream, with stirring at 0° C. until the brown-red color of chromium trioxide persisted in the mixture (the 8 N chromic acid had been prepared by dissolving 26.7 g. of chromium trioxide in 23 cc. of sulfuric acid and diluting with water to 100 cc.). The mixture was then diluted with water, the product was filtered, washed with water, and dried under vacuum, thus giving 9.9 g. of 5α - bromo - 6β - fluoro - 16α,17α - oxido - 21 - acetoxy-pregnane-3,20-dione.

To a solution of 6 g. of the above compound in 20 cc. of acetic acid was added 20 cc. of a saturated solution of hydrogen bromide in acetic acid and kept at a temperature between 0 and 5° C. for 5½ hours. After pouring into water the precipitate was collected, washed with water, dried under vacuum and recrystallized from acetone-hexane, thus furnishing 3.5 g. of the 21-acetate of 6α-fluoro-16β-bromo-Δ⁴-pregnene - 17α,21 - diol - 3,20-dione with M.P. 125–130° C. (with loss of solvent). The analytical sample was obtained by recrystallization from methanol. The pure sample showed M.P. 115–120° C., solidified upon further heating and then melted with decomposition between 180 and 183° C.; [α]$_D$+65° (chloroform); λ max. 236 mμ, log ε 4.21.

A mixture of 3 g. of the compound (M.P. 125–135° C.) and 120 cc. of glacial acetic acid was treated with 30 cc. of acetic anhydride and 1.5 cc. of 70% perchloric acid and kept at room temperature for 4 hours, at the end of which it was poured into water and the solid formed was collected, washed with water and recrystallized from methylene chloride-methanol, thus giving 2.4 g. of the diacetate of 6α-fluoro-16β-bromo-Δ$^4$-pregnene-17α,21 - diol - 3,20 - dione; M.P. 167–170° C. (dec.); [α]$_D$+47° (chloroform); λ max. 235 mμ, log ε 4.14.

A mixture of 2 g. of the above compound (M.P. 165–167° C.), 6 g. of potassium acetate and 70 cc. of glacial acetic acid was refluxed for 3 hours and then most of the acetic acid was distilled under reduced pressure; the residue was cooled and the product precipitated by the addition of water. It was extracted with methylene chloride, the extract was washed with aqueous sodium bicarbonate solution and water, dried over anhydrous sodium sulfate and evaporated. Recrystallization of the residue from methanol afforded 1.2 g. of the 16,21-diacetate of 6α-fluoro-Δ$^4$-pregnene-16α,17α,21-triol-3,20-dione under the form of crystals which still retained solvent and therefore showed a double melting point at 155° C. and 204–205° C.; [α]$_D$+31° (chloroform); λ max. 236 mμ, log ε 4.15.

By following the reaction set forth above, or their modifications described in the following Examples II and III, there was prepared 123 g. of the 16,21-diacetate of 6α-fluoro-Δ$^4$-pregnene-16α,17α,21-triol-3,20-dione, which was dissolved in 2.4 lt. of methanol and treated at 0° C. with a solution of 40 g. of sodium carbonate in 240 cc. of water under an atmosphere of nitrogen and with stirring for 2½ hours. The mixture was then neutralized with acetic acid (15 cc.) and the solid was collected, washed with water and dried. There was thus obtained 89 g. of 6α-fluoro-Δ$^4$-pregnene-16α,17α,21-triol-3,20-dione under the free form which melted around 200° C. The pure compound was obtained by recrystallization from acetone; M.P. 226–228° C. [α]$_D$+63.5° (chloroform); λ max. 236 mμ, log ε 4.20.

*Example II*

A suspension of 4 g. of the acetate of 5α-bromo-6β-fluoro-16α,17α-oxido-pregnan-21-ol-3,20-dione (cf. Example I) in 40 cc. of acetic acid was treated with a stream of dry hydrogen chloride at a temperature around 0° C. for half an hour and then kept at 0° C. for 4½ hours further. The mixture was poured into water and the product was collected by filtration, washed with water, dried and crystallized from methanol thus giving 2.8 g. of a product which melted between 180 and 187° C. (dec.); λ max. 236 mμ, log ε 4.18. It was found that such compound consisted of a mixture of 6α-fluoro-16β-bromo-Δ$^4$-pregnene-17α,21-diol-3,20-dione and of 6α-fluoro-16β-chloro-Δ$^4$-pregnene 17α,21-diol-3,20-dione.

By subsequent acetylation of 2 g. of the above compound, by an analogous method to that described in the preceding example, there was obtained 1.4 g. of its diacetate; M.P. 160–167° C. (dec.); λ max. 236 mμ, log ε 4.17. Upon subsequent reflux with potassium acetate in glacial acetic acid (cf. Example I) there was obtained the 16,21-diacetate of 6α-fluoro-Δ$^4$-pregnene-16α,17α,21-triol-3,20-dione, identical with the intermediate described in the preceding example.

*Example III*

In accordance with the method described in Example I there was prepared 100 g. of the acetate of 5α-bromo-6β-fluoro-16α,17α-oxido-pregnan-21- ol - 3,20-dione which was refluxed with 186 g. of potassium acetate and 5 lt. of acetone for 2 hours. The acetone was distilled under vacuum, the residue triturated with water and the solid collected by filtration, washed with water, dried and recrystallized from methanol-ether, thus yielding 73 g. of the acetate of 6β-fluoro-16α,17α-oxido -Δ$^4$-pregnen-21 - ol 3,20 dione having M.P. 165° C. By recrystallization from methanol there was obtained the pure product with M.P. 173–174° C, [α]$_D$—68° (chloroform), λ max. 235 mμ, log ε 4.10.

A mixture of 73 g. of the above compound (M.P. 165° C.) and 800 cc. of glacial acetic acid was treated for 3 hours at room temperature with a stream of dry hydrogen chloride; the mixture was then poured into water and the precipitate was collected, washed with water, dried and recrystallized from methylene chloride-methanol, thus affording 58 g. of the 21-acetate of 6α-fluoro-16β - chloro-Δ$^4$-pregnene-17α,21-diol - 3,20 - dione, M.P. 198° C. The analytical sample was obtained by recrystallization and showed M.P. 207–208° C.; [α]$_D$+78° (chloroform); λ max. 236 mμ, log ε 4.21.

The hydroxyl group at 17α was then acetylated by the method described in Example I, to produce 42.5 g. of the diacetate of 6α-fluoro-16β-chloro-Δ$^4$-pregnene-17α,21-diol-3,20-dione of M.P. 188–189° C. The analytical sample melted at 197–198° C. [α]$_D$+66° (chloroform), λ max. 235 mμ, log ε 4.21.

Exactly as described in Example I it was then refluxed with potassium acetate in glacial acetic acid, to produce the intermediate 16,21-diacetate of 6α-fluoro-Δ$^4$-pregnene-16α,17α,21-triol-3,20-dione, identical with the compound described in Example I.

*Example IV*

A solution of 250 g. of the 16,21-diacetate of 6α-fluoro-16β-chloro-Δ$^4$-pregnen-17α,21-diol - 3,20 - dione of Example III in 2.5 lt. of dimethylformamide and 40 ml. of water was refluxed for one hour. After cooling the solution was poured into water. The precipitated product was filtered and crystallized from methylene chloride-methanol. 200 g. of the 16,21-diacetate of 6α-fluoro-Δ$^4$-pregnen-16α,17α,21-triol-3,20-dione of Example I was obtained.

The above experiment was repeated except that instead of the 2.5 lt. of dimethylformamide there were used 2 lt. of dimethylformamide, 200 ml. pyridine and 20 ml. of water. The yield was 163 g.

The experiment was again repeated except that to 242 g. of the starting compound there was used 1.2 lt. dimethylformamide, 1.2 lt. of dimethylacetamide, 242 ml. pyridine, and 24 ml. water. The yield after 40 minutes of reflux and the same workup was 190 g. The same results were also obtained with the 16β-bromo starting material of Example I and the mixed 16β-bromo, chloro starting material of Example II.

*Example V*

There were prepared the following solutions A, B and C using distilled water as solvent; there were mixed 425 cc. of a 1.74% solution of dipotassium hydrogen phosphate with 75 cc. of a 1.38% solution of sodium dihydrogen phosphate to form solution A; a mixture of 1 lt. of 4.5% sodium chloride solution, 40 cc. of 5.75% potassium chloride solution and 10 cc. of 19.1% magnesium sulfate solution was diluted to 5 lt. to produce solution B; there were dissolved 20.9 g. of fumaric acid and 14.4 g. of sodium hydroxide in 1 lt. of water and the solution was diluted to 1.2 lt., thus giving solution C. There were mixed 475 cc. of solution A, 4.32 lt. of solution B and 1.2 lt. of solution C.

The fat was removed from the adrenal glands of recently slaughtered bovine and the glands were ground in a meat grinder until an homogeneous mass was obtained.

To 9 kg. of this mass was added 6 g. of 6α-fluoro-Δ$^4$-pregnene-16α,17α,21-triol-3,20-dione suspended in 6 lt. of the mixture of solutions A, B and C described above and incubated for 3 hours in open Erlenmeyer flasks, under continuous stirring. The contents of the flasks were then combined, treated with 30 lt. of acetone and stirred for 1 hour at room temperature. The solid was filtered, the filter was washed with acetone, the filtrate and washings were combined and the solvent was distilled under reduced pressure until the volume had been reduced to approximately one third. The residue was then extracted with 2 portions of 4 lt. of hexane and the extract was discarded. The mixture was then extracted with 3 portions of 5 lt. each of methylene chloride, the extracts were combined, washed with water, dried over anhydrous sodium sulfate and the solvent was evaporated. The residue was stirred with approximately 30 cc. of methylene chloride, cooled and the solid was collected by filtration. There was thus obtained 3 g. of crude 6α-fluoro-16α-hydroxy-hydrocortisone of a greenish color and M.P. 220-225° C. By recrystallization from acetone-methanol and decolorizing with charcoal there was obtained the analytical sample of M.P. 233-236° C. $[\alpha]_D+95°$ (dioxane); λ max. 236–238 mµ, log ε 4.18.

Example VI

A mixture of 1.2 g. of 6α-fluoro-16α-hydroxy-hydrocortisone, 4 cc. of acetic anhydride and 8 cc. of pyridine was heated at 60° C. for 2 hours and then kept at room temperature for 2 hours. Ice and water were added and the solid was collected, washed with water, dried and recrystallized from methylene chloride-methanol, thus giving 1.05 g. of the 16,21-diacetate of 6α-fluoro-16α-hydroxy-hydrocortisone (solvated) of M.P. 187-182° C.; concentration of the mother liquors afforded an additional 130 mg. of the same compound, M.P. 184-187° C. By recrystallization from the same solvents there was obtained the compound with a lower constant melting point of 175-177° C.; $[\alpha]_D+70°$ (dioxane); λ max. 238 mµ, log ε 4.20.

2.94 g. of the 16,21-diacetate of 6α-fluoro-16α-hydroxy-hydrocortisone was mixed with 60 cc. of dimethylformamide, 3.6 cc. of pyridine and 2.4 cc. of methanesulfonyl chloride was heated on the steam bath for 2 hours. The diacetate of 6α-fluoro-16α-hydroxy-hydrocortisone had been prepared as set forth above, and further dried by azeotropic distillation with benzene; the dimethylformamide had been recently distilled. After the 2 hours on the steam bath the mixture was cooled and poured into saturated aqueous sodium bicarbonate solution; the product was extracted with methylene chloride, the extract was washed with water, dried over anhydrous sodium sulfate and the solvent was evaporated. The residue was chromatographed on 90 g. of silica gel eluting the product with methylene chloride-acetone (9:1) and then recrystallizing from methylene chloride-methanol. There was thus obtained 1.6 g. of the 16,21 - diacetate of 6α - fluoro - $\Delta^{4,9(11)}$ - pregnadiene-16α,17α,21-triol-3,20-dione with M.P. 110–114° C.; the analytical sample melted at 115-117° C., $[\alpha]_D+23.5°$ (chloroform), λ max. 234–236mµ, log ε 4.18.

A mixture of 1.38 g. of the above compound and 15 cc. of dioxane was treated with 1.9 cc. of a 0.5 N aqueous solution of perchloric acid and 600 mg. of N-bromoacetamide, adding the latter in the dark, in three portions, in the course of half an hour and under continuous stirring. It was then stirred for a further 1¾ hours in the dark, then the excess of reagent was decomposed by the addition of aqueous sodium bisulfite solution and ice water was added; the product was extracted with methylene chloride, washed with water, dried over anhydrous sodium sulfate and the solvent was evaporated under reduced pressure, thus giving a yellow oil consisting of the 16,21-diacetate of 6α-fluoro-9α-bromo-16α-hydroxy-hydrocortisone which was used for the next step without further purification.

The above crude bromohydrin was mixed with 2.5 g. of potassium acetate and 60 cc. of acetone and refluxed for 6 hours, at the end of which the acetone was distilled, water was added to the residue and the product was extracted with methylene chloride. The extract was washed with water, dried over anhydrous sodium sulfate and the solvent was evaporated. Recrystallization of the residue from methanol furnished 800 mg. of the 16,21-diacetate of 6α - fluoro - 9β,11β - oxido - $\Delta^4$-pregnene-16α,17α,21-triol-3,20-dione with M.P. 120–124° C.; by chromatography of the mother liquors on silica gel there was obtained 180 mg. more of the same compound with M.P. 117-119° C. The analytical sample was obtained by recrystallization from methanol; it showed M.P. 125–127° C., $[\alpha]_D-13°$ (chloroform), λ max. 238 mµ, log ε 4.14.

To a solution of 1.6 g. of anhydrous hydrogen fluoride in 2.85 g. of tetrahydrofurane and 10 cc. of methylene chloride cooled to —60° C. was added a solution of 650 mg. of the 16,21-diacetate of 6α-fluoro-9β,11β-oxido-$\Delta^4$-pregnene-16α,17α,21-triol-3,20-dione in 20 cc. of methylene chloride and the mixture was kept at —10° C. for 72 hours. It was then poured into saturated aqueous sodium bicarbonate solution and the organic layer was separated, washed with water, dried over anhydrous sodium sulfate and evaporated. The residue was reacetylated by heating with 3 cc. of acetic anhydride and 6 cc. of pyridine for 1 hour on the steam bath. The reagents were evaporated under reduced pressure and the residue was chromatographed on 30 g. of silica gel. Upon elution with methylene chloride-acetone (9:1) and recrystallization of the residue from methylene chloride-methanol there was obtained 290 mg. of the 16,21 - diacetate of 6α,9α - difluoro - 16α - hydroxy-hydrocortisone which melted with loss of solvent at 140–150° C. Recrystallization from acetone-hexane afforded the analytical sample which was dried at 130° C.; it then showed a M.P. of 182-185° C.; $[\alpha]_D+77°$ (dioxane, λ max. 234 mµ, log ε 4.20.

Example VII

A mixture of 290 mg. of the 16,21-diacetate of 6α,9α-difluoro-16α-hydroxy-hydrocortisone, 30 cc. of t-butanol, 0.5 cc. of pyridine and 150 mg. of selenium dioxide was refluxed for 53 hours under an atmosphere of nitrogen and cooled; ethyl acetate was added and filtered through celite; the solvent was evaporated to dryness under reduced pressure, the residue was triturated with water, the solid was collected by filtration, washed with water and dried. The product was then chromatographed on 10 g. of silica gel. The solid fractions eluted with acetone-methylene chloride (1:19) were recrystallized from methylene chloride, thus affording 68 mg. of the 16,21-diacetate of 6α,9α - difluoro - 16α - hydroxy - prednisolone; M.P. 212–215° C.; $[\alpha]_D+51°$ (dioxane); λ max. 238 mµ, log ε 4.23.

Example VIII

A mixture of 430 mg. of the 16,21-diacetate of 6α,9α-difluoro-16α-hydroxy-prednisolone of the preceding example, 15 cc. of methanol and 2.2 cc. of a 4% aqueous solution of potassium hydroxide was stirred at 0° C. in an atmosphere of nitrogen; the material entered rapidly in solution and reprecipitated after 30 minutes. The mixture was then stirred for 1 hour more at 0° C. and under an atmosphere of nitrogen, then neutralized with acetic acid and the methanol was distilled under reduced pressure. The residue was triturated with water, the solid was collected, washed with water, dried and recrystallized from ethyl acetate-methanol, thus giving 285 mg. of the free 6α,9α - difluoro - 16α - hydroxy - prednisolone, M.P. 258–260° C.; the analytical sample showed M.P. 266–268° C., $[\alpha]_D+43°$ (dioxane), λ max. 238 mµ, log ε 4.23. This compound retained some solvent and could not be isolated free of it.

Example IX 1 g. of the 16,21-diacetate of 6α-fluoro-16α-hydroxy-hydrocortisone (Example V) was treated with 300 mg. of chromium trioxide in 50 cc. of 80% acetic acid, with stirring at room temperature for 1 hour. After diluting with water the precipitate was collected, dried and recrystallized from acetone-hexane, thus furnishing the 16,21-diacetate of 6α-fluoro-16α-hydroxy-cortisone.

*Example X*

140 mg. of 6α-fluoro-16α-hydroxy-hydrocortisone (Example V) was suspended in 5 cc. of acetone containing two drops of 72% perchloric acid. After stirring for 5 minutes all of the material dissolved and then the mixture was stirred for 15 minutes further, diluted with water and extracted with methylene chloride. The extract was washed with water, dried over anhydrous sodium sulfate and evaporated, thus giving an oily residue which was treated with 1 cc. of acetic anhydride and 2 cc. of pyridine and kept overnight at room temperature. It was then diluted with ice water, the solid was collected, washed with water, dried and recrystallized from acetone-hexane, thus yielding 6α-fluoro-16α-17α-isopropylidenedioxy - 21 - acetoxy - $\Delta^4$ - pregnen - 11β - ol - 3,20-dione; M.P. 261–263° C., $[\alpha]_D$+135° (chloroform); λ max. 236–8 mμ, log ε 4.18.

155 mg. of the above compound was dehydrogenated by the reaction with selenium dioxide described in Example VIII, thus producing 6α-fluoro-16α,17α-isopropylidenedioxy - 21 - acetoxy - $\Delta^{1,4}$ - pregnadien - 11β - ol-3,20-dione; M.P. 278–281° C., $[\alpha]_D$+92° (chloroform), λ max. 240–242 mμ, log ε 4.16.

*Example XI*

In accordance with the method described in the preceding example there was prepared the acetonide of 6α,9α-difluoro-16α-hydroxy-prednisolone (see Example VIII); M.P. 265–266° C.; $[\alpha]_D$+95° (chloroform), λ max. 238 mμ, log ε 4.21.

*Example XII*

A mixture of 2 g. of 6α,9α-difluoro-16α-hydroxy-hydrocortisone of Example VIII and 10 cc. of pyridine was treated with 3 cc. of propionic anhydride and kept overnight at room temperature; it was then poured into water, heated for half an hour on the steam bath, cooled and the solid was collected, washed with water, dried and recrystallized from acetone-hexane, thus giving the 16,21-dipropionate of 6α,9α - difluoro-16α-hydroxy-hydrocortisone. Upon further treatment with chromic acid in aqueous acetic acid, in accordance with the method described in Example IX, there was obtained the 16,21-dipropionate of 6α,9α-difluoro-16α-hydroxy-cortisone.

*Example XIII*

A solution of 2 g. of the 16,21-diacetate of 6α-fluoro-9β,11β - oxido-$\Delta^4$-pregnene - 16α,17α,21 - triol-3,20-dione (Example VI) in 20 cc. of pure chloroform was cooled to 0° C. and treated with 4 cc. of a 0.5 N solution of dry hydrogen chloride in chloroform. The mixture was stirred at 0° C. for 1 hour, water was then added and the chloroform layer was separated, washed with water, then with 5% aqueous sodium carbonate solution and finally again with water, dried over anhydrous sodium sulfate and evaporated under reduced pressure. Recrystallization of the residue from acetone afforded the 16,21-diacetate of 6α-fluoro - 9α - chloro-16α-hydroxy-hydrocortisone.

This compound was then subjected to the dehydrogenation with selenium dioxide (cf. Example VII) to produce its 1-dehydro-analog; furthermore, the 11β-hydroxyl group of the 16,21-diacetates of the 6-fluoro-9α-chloro-11β-hydroxy-$\Delta^4$ and $\Delta^{1,4}$-compounds was oxidized to the keto group by the method of Example IX. In all of the above 6-fluoro-9-chloro-compounds there were further hydrolyzed the acetoxy groups (Example I) and the free alcohols at C–17 and C–21 were reesterified (cf. Examples VI and XII) and there were further formed their acetonides (Example IX).

*Example XIV*

The method of dehydrogenation at C–12 by the reaction with selenium dioxide (Example VII) was applied to the 16,21-diacetate of 6α-fluoro-16α-hydroxy-hydrocortisone (Example V) to produce the 16,21-diacetate of 6α-fluoro-16α-hydroxy-prednisolone. The latter compound was converted into the 16,21-diacetate of 6α-fluoro-9α-bromo-$\Delta^{1,4}$-pregnadiene - 11β,16α,17α,21 - tetrol-3,20-dione which was then transformed in the 16,21-diacetate of 6α-fluoro-9β,11β-oxido-$\Delta^{1,4}$-pregnadiene - 16α,17α,21-triol-3,20-dione, whose epoxide ring was opened with hydrogen fluoride to produce the 16,21-diacetate of 6α,9α-difluoro-16α-hydroxy-prednisolone, by following the procedure described in Example VI. The oxide ring of the 1,4-diene was further opened by reaction with hydrogen chloride (Example XIII) to produce the 16,21-diacetate of 6α-fluoro-9α-chloro-16α-hydroxy-prednisolone.

We claim:

1. A process for the production of the 16,21-diacetate of 6α-fluoro-$\Delta^4$-pregnen - 16α,17α,21 - triol - 3,20 - dione comprising reacting the 21-acetate of 6β-fluoro-5α-bromo-16α,17α-oxido-pregnan-21-ol-3,20-dione with a hydrogen halide selected from the group consisting of hydrogen bromide and hydrogen chloride in the presence of acetic acid to form the 21-acetate of 6α-fluoro-16β-halo-$\Delta^4$-pregnen-17α,21-diol-3,20-dione, reacting the last mentioned compound with acetic anhydride to form the corresponding 17,21-diacetate and reacting the diacetate with a reagent selected from the group consisting of (A) potassium acetate in acetic acid, (B) dimethylformamide and water, (C) dimethylacetamide and water, (D) dimethylformamide, water and pyridine, and (E) dimethylacetamide, water and pyridine.

2. The process of claim 1 wherein the reagent is potassium acetate in acetic acid.

3. The process of claim 1 wherein the reagent is dimethylformamide and water.

4. The process of claim 1 wherein the reagent is dimethylacetamide and water.

5. The process of claim 1 wherein the reagent is dimethylformamide, water and pyridine.

6. The process of claim 1 wherein the reagent is dimethylacetamide, water and pyridine.

No references cited.